United States Patent [19]
Rocton et al.

[11] 3,728,466
[45] Apr. 17, 1973

[54] COAXIAL CABLE HAVING A FLUID STOP THEREIN AND METHOD FOR PRODUCING A COAXIAL CABLE WHICH IS IMPERVIOUS TO THE PASSAGE OF AIR THERETHROUGH

[75] Inventors: Lucien Rocton, Malakoff; Robert Belisaire, Paris, both of France

[73] Assignee: Compagnie Industrielle des Telecommunications Cit Alcatel, Paris, France

[22] Filed: July 19, 1971

[21] Appl. No.: 163,573

[30] Foreign Application Priority Data

July 17, 1970 France..............................7026551

[52] U.S. Cl.......................174/23 R, 29/592, 156/48, 156/50, 174/70 S
[51] Int. Cl. .........................H02g 15/00, H02g 1/00
[58] Field of Search ...................174/20, 22 R, 22 C, 174/23 R, 23 C, 70 S, 77 R, 88 R, 88 C, 89, 151; 156/48, 50, 51; 29/592

[56] References Cited

UNITED STATES PATENTS

| | | | |
|---|---|---|---|
| 2,678,963 | 5/1954 | Everhart | 174/151 UX |
| 1,762,255 | 6/1930 | Baldwin | 156/48 |
| 2,945,914 | 7/1960 | Aamodt | 174/23 R X |

FOREIGN PATENTS OR APPLICATIONS 1,090,737  10/1960  Germany..........................174/77 R Primary Examiner—Laramie E. Askin
Attorney—Craig, Antonelli et al.

[57] ABSTRACT

A method of producing a cable having an internal blocking zone which is impassable to air, thereby assuring the imperviousness of the cable at the entrance to an equipment box to which the cable is connected, the blocking zone including an internal volume surrounding the inner conductor of the cable and filled with a pliable insulating material.

15 Claims, 2 Drawing Figures

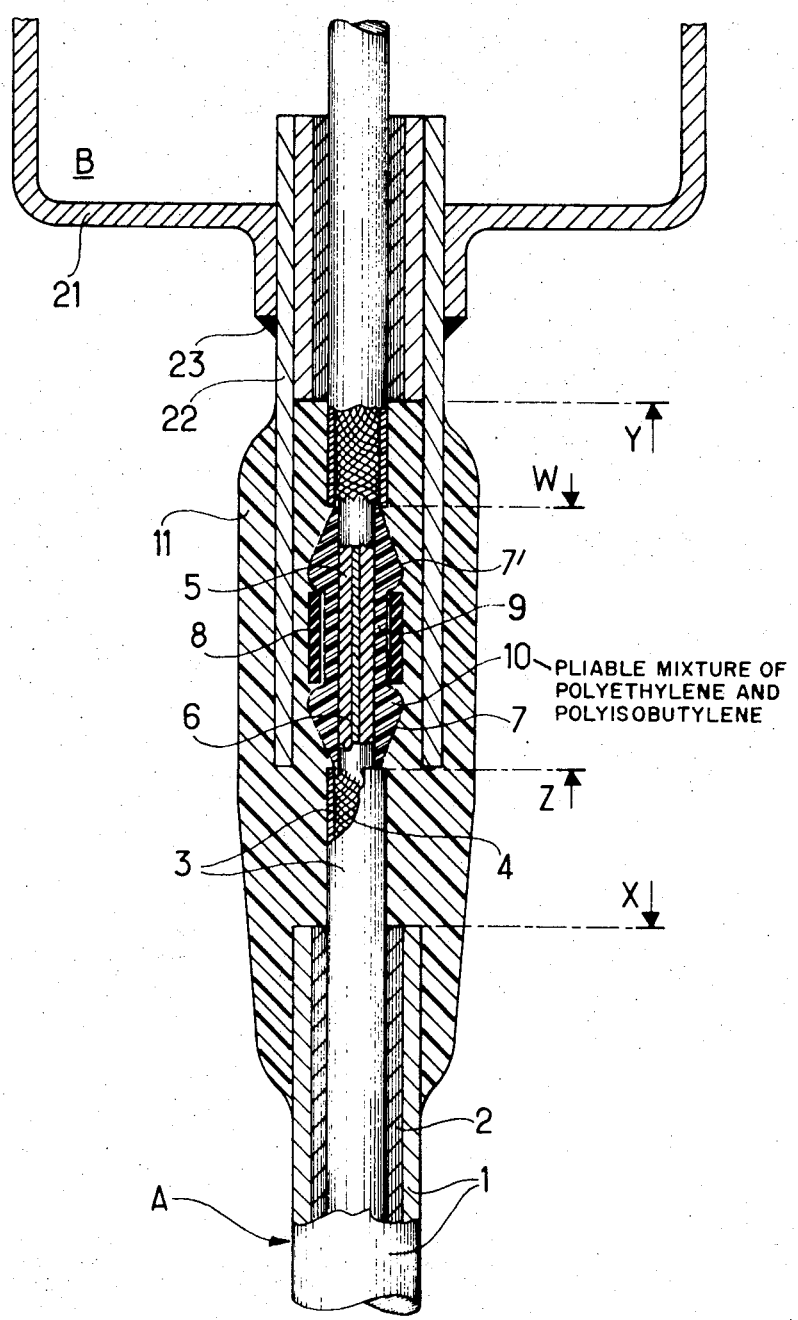

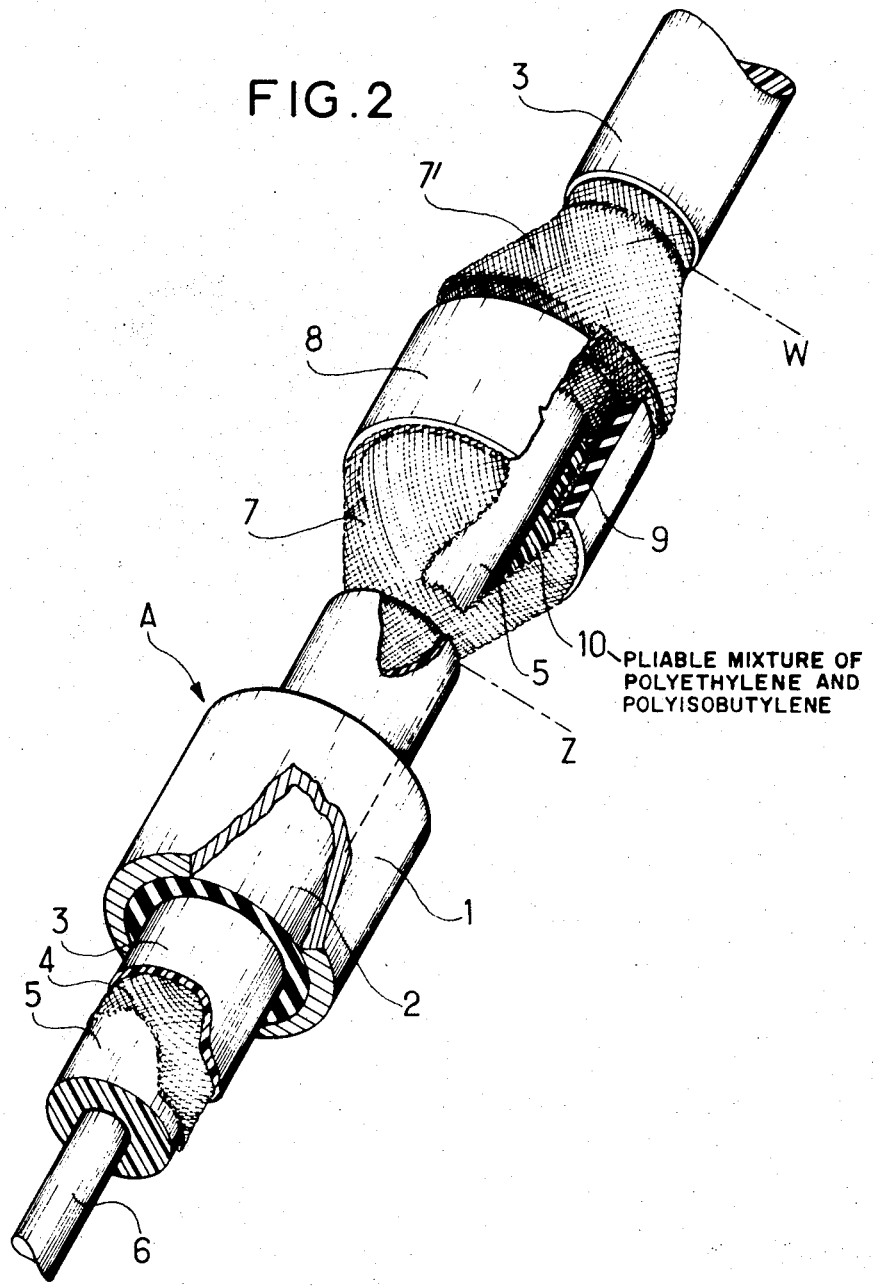

COAXIAL CABLE HAVING A FLUID STOP THEREIN AND METHOD FOR PRODUCING A COAXIAL CABLE WHICH IS IMPERVIOUS TO THE PASSAGE OF AIR THERETHROUGH

The present invention pertains to the field of coaxial cables. It relates to a coaxial cable and the method of construction thereof which creates in the cable a blocking zone which is impassable to air. The principal application consists in assuring the imperviousness to the passage of air at the opening of an equipment box through a connection with either one or several coaxial cables having a great length.

In certain types of underground connections between coaxial cables and equipment elements, for example repeaters, impulse regenerators, etc., which are inserted at regular intervals along the cable, the elements may be placed in buried boxes. Thus, it is important that these elements be protected from the moisture in the atmosphere and the surrounding soil. In such a box there can prevail an increased pressure or a reduced pressure in the order of 200 milibars, this pressure being a function of the temperature differences between the interior and exterior of the box subsequent to the closing of the box. Both of the openings to the box must therefore be shielded from the atmosphere by means of an impervious plug. This imperviousness must be assured both at the outside of the coaxial cable and at the same time also at the inside thereof. The outside air must not be able to penetrate into the interior of the box, either along the outer casing of the cable, or along the inner conductor.

For the purpose of assuring the exterior imperviousness of the box, it is conventional to surround or enclose the coaxial cable, whose outer conductor is provided in the form of a braid or strand, in proximity to the opening of the box with a molded resin, for example, made of an epoxy resin (Araldite). Since, according to the known method, the cable is stripped over a length of several inches, the molded epoxy resin is in contact through the aforementioned braid with the dielectric that forms the cylindrical covering between the braid and the inner conductor.

The thermal coefficient of expansion of the aforementioned dielectric is, however, greater than that of the resin. As a result, if the temperature increases, there will occur a swelling and tightening of the dielectric against the resin thereby insuring the imperviousness of the seal. On the other hand, if the surrounding temperature falls to any great extent, a shrinking or contraction of the dielectric within the volume of the resin will occur, with the result that spaces are created and the interior imperviousness of the cable is no longer assured.

The present invention remedies this drawback by establishing between the molded resin and the dielectric an intermediate viscous sleeve which firmly adheres to the resin on the outside and to the dielectric on the inside at any temperature that may be encountered, thereby assuring the interior imperviousness under all circumstances by virtue of its plasticity.

The process proposed by the present invention will be described in further detail hereinbelow with reference to the accompanying drawings which illustrate one exemplary embodiment, wherein FIG. 1 is a longitudinal sectional view of a coaxial cable according to the present invention and of the opening of an equipment box where this cable penetrates, and FIG. 2 is a corresponding perspective view of the embodiment of FIG. 1.

The coaxial cable in its entirety has been designated with reference symbol A, and the equipment box has been designated with reference symbol B. The cable comprises, for example, a lead casing or armoring layer 1 disposed over a paper insulating layer 2, which surrounds a polyvinyl chloride casing 3 enclosing an outer conductor 4 provided in braided form. This outer conductor 4 is insulated from an interior conductor 6 by means of a dielectric layer 5.

The braid 4 includes at 7 and 7' two enlarged zones separated by a clamp 8 which produces an area of annular constriction 9. The interior of the enlarged zones 7 and 7' and of the constricted zone 9 is filled with a chemically neutral insulating material 10 having the consistency of "butter," which is advantageously made up of a mixture of polyethylene and polyisobutylene of the type known by the commercial name "Telcompound."

The layers 1 and 2 of the cable have been stripped to expose the polyvinyl chloride casing 3 between the two planes X and Y and the layer 3 has been stripped to expose the braid 4 between the two planes Z and W within the zone between planes X and Y. A molded resin 11 covers the entire stripped portion.

The section of a wall 21 of the box B is seen in FIG. 1, which wall has an opening for the passage of the cable. The opening in the wall 21 supports a metallic tube 22 which serves as a mechanical reinforcement for the cable and is welded at 23 to the wall 21. The tube 22 has a length sufficient to cover the stripped zone of the cable over the length thereof extending to the plane Z.

The process of the present invention comprises the following steps: 1. Stripping the cable to the polyvinyl chloride casing 3 between the two planes X and Y; 2. Stripping the cable to the braid 4 between the two planes Z and W within the zone defined by the planes X and Y; 3. Providing an enlarged zone on the braid 4 by manually pushing back the wires of the braid from the two sides toward the center of the zone to be expanded; (4) Inserting through a hole disposed in the expanded portion of the braid a dispenser, such as a small tube filled with a mixture of insulating material having the consistency of butter, such as "Telcompound," and injecting the mixture therein; (5) With the use of a spacer member, placing a clamp which consists of at least one elastic ring, i.e. can take the form of a pair of superimposed rings, made from neoprene around a portion of said expanded zone at the center thereof so as to form two expanded areas which are separated by means of a thin annular trough under said clamp; and (6) Finally enclosing, by means of a process which is well known and which will therefore not be described in detail, the entire stripped zone and slightly beyond with a molded resin, preferably of a material of the epoxy type.

The clamp 8 has a suitable elasticity so that the clamping thus obtained does not cause the material 10 to flow completely toward the exterior, but on the contrary, does assure a tightening or locking sufficient to cause the material 10 to cling well to the subjacent walls through the braid. Hence, in case of thermal variations, the plasticity of the material 10 assures at all times an integral filling of the space between the resin 11 and the dielectric 5.

The exterior imperviousness is assured by the adherence of the resin 11 to the metallic tube 22 and on the lead casing 1 of the cable; while, the interior imperviousness is assured by the play of the clamp 8 and of the pliable insulating material 10.

What is claimed is:

1. A process for rendering a coaxial cable internally moisture impervious, said cable having an inner conductor and an outer conductor in braided form separated by an insulating layer, the steps comprising
expanding a portion of said braided outer conductor to provide a hollow between said insulating layer and said outer conductor,
injecting a permanently pliable insulating material into said hollow to completely fill said hollow,
applying an elastic clamp about at least part of said expanded portion of said braided outer conductor, and
enclosing the entire expanded portion of said outer conductor with a molded resin.

2. A process as defined in claim 1 wherein said elastic clamp is positioned approximately at the center of said hollow and restricts the size of the hollow at that point so that said hollow includes respective expanded portions on either side of said clamp.

3. A process as defined in claim 1 wherein said clamp is a ring made from elastic material.

4. A process as defined in claim 1 wherein said clamp is formed from a pair of superimposed rings.

5. A process as defined in claim 1 wherein the portion of said braided outer conductor is expanded by manually pushing back the wires of the braid from the two sides toward the center of the zone to be expanded.

6. A process for rendering a coaxial cable internally moisture impervious, said cable having an inner conductor, an outer conductor in braided form, a first insulating layer separating said inner and outer conductors, and a second insulating layer surrounding said outer conductor, the steps comprising
stripping said second insulating layer from said cable within a first zone,
expanding a portion of said braided outer conductor within said first zone by manually pushing back the wires of the braid from the two sides toward the center of the zone,
injecting a permanently pliable insulating material into the hollow formed by the expanded portion of said braided outer conductor so as to completely fill said hollow,
applying an elastic clamp about at least part of said expanded portion of said braided outer conductor, and
enclosing the entire first zone with a molded resin.

7. A process as defined in claim 6 wherein said cable additionally includes a third insulating layer and an outer armoring sheath surrounding said second insulating layer, and further including the step of stripping said armoring sheath and said third insulating layer in a second zone including said first zone, said molded resin enclosing said entire second zone.

8. A process as defined in claim 7 wherein said elastic clamp is positioned approximately at the center of said hollow and restricts the size of the hollow at that point so that said hollow includes respective expanded portions on either side of said clamp.

9. A process as defined in claim 7 wherein said clamp is a ring made from elastic material.

10. A process as defined in claim 7 wherein said clamp is formed from a pair of superimposed rings.

11. A coaxial cable which is internally moisture impervious, comprising an inner conductor, an outer conductor in braided form, an insulating layer separating said inner and outer conductors, a portion of said braided outer conductor being expanded to provide a hollow between said insulating layer and said outer conductor, a permanently pliable insulating material completely filling said hollow, an elastic clamp disposed about the expanded portion of said braided outer conductor so as to restrict a portion of said hollow, and a molded resin enclosing the entire expanded portion of said outer conductor.

12. A coaxial cable as defined in claim 11 wherein said clamp is a ring made from elastic material.

13. A coaxial cable as defined in claim 11 wherein said clamp is formed from a pair of superimposed rings.

14. A coaxial cable as defined in claim 11 wherein said pliable insulating material is made up of a mixture of polyethylene and polyisobutylene.

15. A coaxial cable as defined in claim 11 wherein said clamp is made of neoprene.

* * * * *